United States Patent
Pan et al.

(10) Patent No.: US 9,282,314 B2
(45) Date of Patent: Mar. 8, 2016

(54) STEREOSCOPIC VIDEO PROCESSING WITH SEPARABLE 2D FILTER

(75) Inventors: Feng Pan, Richmond Hill (CA); Yang Liu, Richmond Hill (CA)

(73) Assignee: VIXS SYSTEMS, INC., Toronto (CA)

( * ) Notice: Subject to any disclaimer, the term of this patent is extended or adjusted under 35 U.S.C. 154(b) by 670 days.

(21) Appl. No.: 13/034,576

(22) Filed: Feb. 24, 2011

(65) Prior Publication Data

US 2012/0218380 A1    Aug. 30, 2012

(51) Int. Cl.
  *H04N 13/00*   (2006.01)
  *H04N 19/597*  (2014.01)
  *H04N 19/30*   (2014.01)
  *H04N 19/80*   (2014.01)
  *H04N 19/42*   (2014.01)

(52) U.S. Cl.
  CPC ........... *H04N 13/0048* (2013.01); *H04N 19/30* (2014.11); *H04N 19/439* (2014.11); *H04N 19/597* (2014.11); *H04N 19/80* (2014.11)

(58) Field of Classification Search
  CPC .................................................. H04N 13/0048
  USPC .......................................................... 348/43
  See application file for complete search history.

(56) References Cited

U.S. PATENT DOCUMENTS 6,611,625 B1 *   8/2003   Son et al. ...................... 382/238
2012/0027079 A1 *   2/2012   Ye et al. .................... 375/240.02

OTHER PUBLICATIONS

Tourapis, et al., "A Frame Compatible System for 3D Delivery;" Dolby Laboratories Inc.; Jul. 2010, ISO/IEC JTC1/SC29/WG11 MPEG2010/M17926, Geneva, Switzerland, pp. 65.

* cited by examiner

*Primary Examiner* — Richard Torrente
(74) *Attorney, Agent, or Firm* — Garlick & Markison; Bruce E. Stuckman

(57) ABSTRACT

A two-dimensional filter operates in accordance with a three-dimensional television signal having a basic layer, a reference processing unit layer and an enhancement layer. The two-dimensional filter generates a processed base layer reference picture from a base layer reference picture via a one-dimensional horizontal filter that horizontally filters the base layer reference picture to generate a first filtered base layer reference picture and a one-dimensional vertical filter, coupled to, but separable from, the one-dimensional horizontal filter, that vertically filters the first filtered base layer reference picture to generate a pre-processed base layer reference picture.

20 Claims, 7 Drawing Sheets

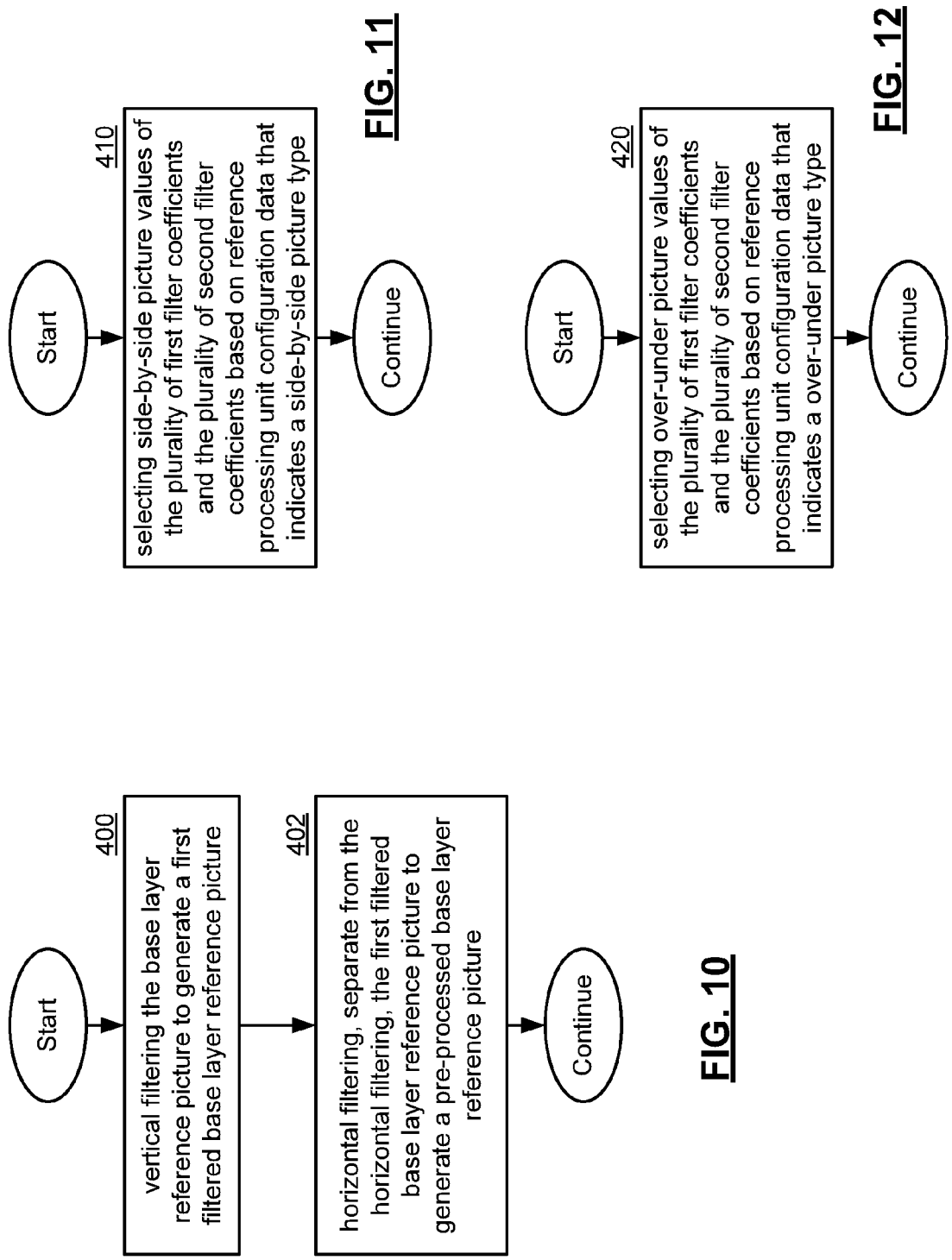

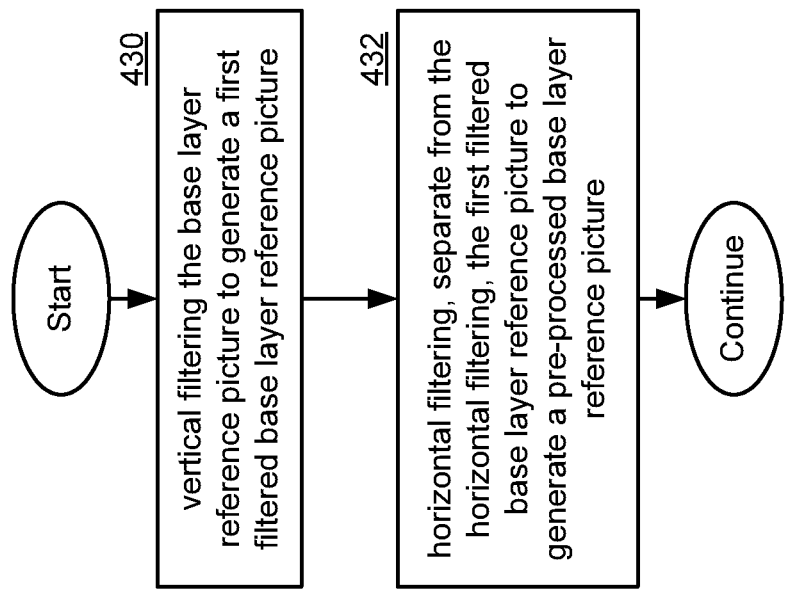

STEREOSCOPIC VIDEO PROCESSING WITH SEPARABLE 2D FILTER

CROSS REFERENCE TO RELATED PATENTS

Not Applicable

TECHNICAL FIELD OF THE INVENTION

The present invention relates to coding used in devices such as video encoders/decoders for stereoscopic television signals.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

For many years, the motion picture industry produced films that are displayed to the audience in three-dimensional (3D) format. Audience members wear special glasses with either red and green filters or lenses of orthogonal polarizations to present different views of a scene to each eye, creating a stereoscopic effect. Further, 3D/stereoscopic televisions have been produced that operate based on video signals having two views, one for each eye. The Motion Picture Expert Group (MPEG) presented a Multiview Video Coding (MVC) extension for MPEG-4 AVC for standardization. In July of 2010, Dolby Laboratories Inc. presented a contribution to the International Organization for Standardisation ISO/IEC JTC1/SC29/WG11, MPEG2010/M17926 entitled, "A Frame Compatible System for 3D Delivery".

Efficient and fast encoding and decoding of video signals is important to the implementation of many video devices, particularly video devices that are destined for home use. Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 10 presents a block diagram representation of a method in accordance with an embodiment of the present invention.

FIG. 11 presents a block diagram representation of a method in accordance with an embodiment of the present invention.

FIG. 12 presents a block diagram representation of a method in accordance with an embodiment of the present invention.

FIG. 13 presents a block diagram representation of a method in accordance with an embodiment of the present invention.

DETAILED DESCRIPTION OF THE INVENTION INCLUDING THE PRESENTLY PREFERRED EMBODIMENTS

Figure 1:
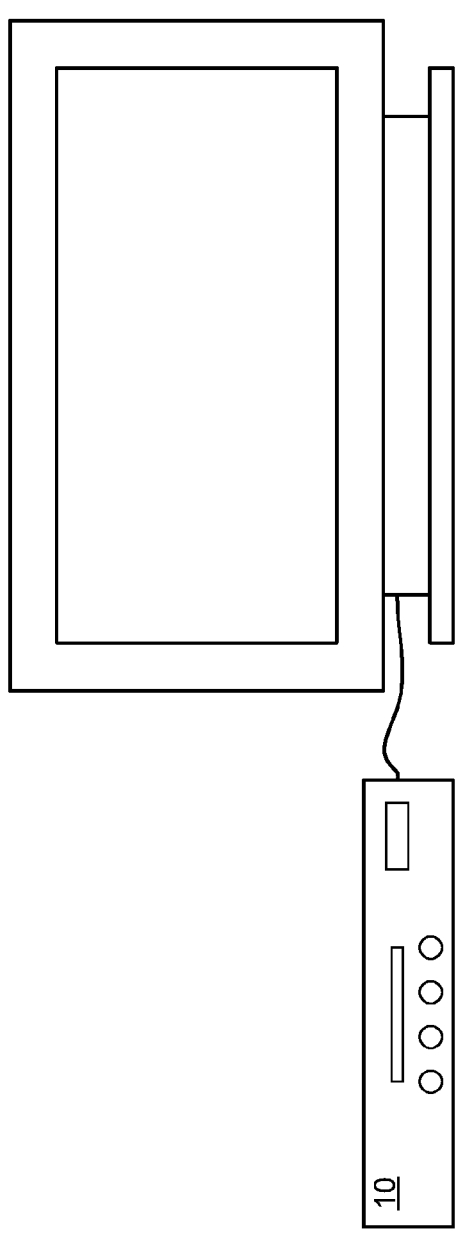
FIGS. 1-3 present pictorial diagram representations of various video devices in accordance with embodiments of the present invention.
Figure 3:
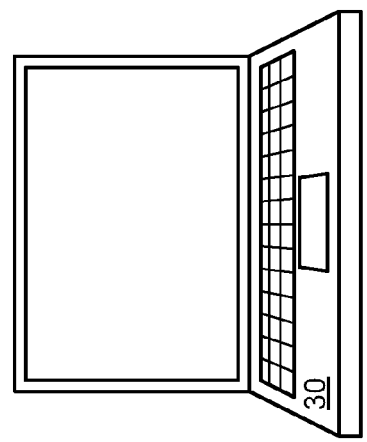
Figure 2:
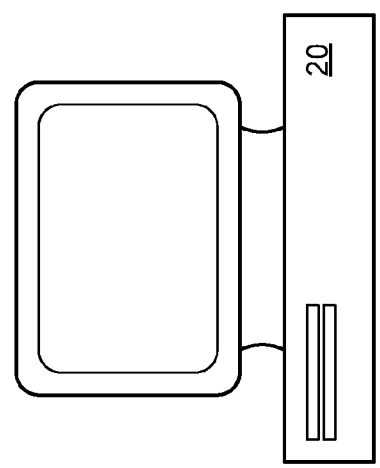

FIGS. 1-3 present pictorial diagram representations of various video devices in accordance with embodiments of the present invention. In particular, set top box 10 with built-in digital video recorder functionality or a stand alone digital video recorder, computer 20 and portable computer 30 illustrate electronic devices that incorporate a video encoder or decoder for processing stereoscopic television signals in accordance with one or more features or functions of the present invention. While these particular devices are illustrated, the present invention can be implemented in any device that is capable of encoding, decoding and/or transcoding video content in accordance with the methods and systems described in conjunction with FIGS. 4-13 and the appended claims.

Figure 4:
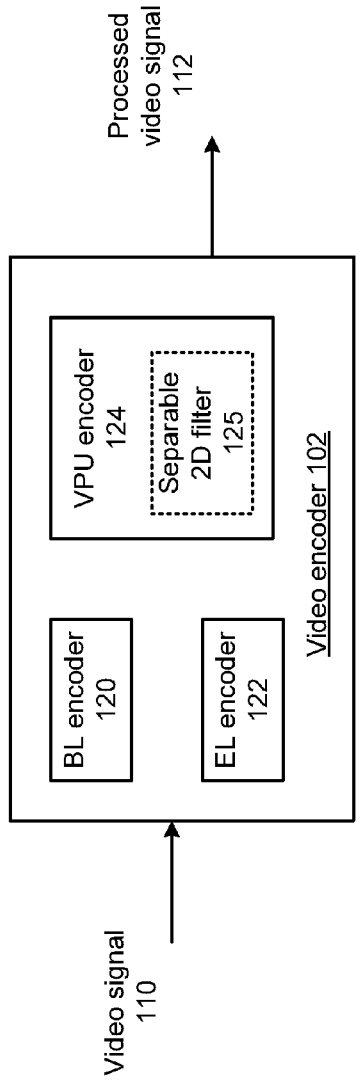
FIG. 4 presents a block diagram representation of a video encoder 102 in accordance with an embodiment of the present invention.

FIG. 4 presents a block diagram representation of a video encoder 102 in accordance with an embodiment of the present invention. In particular, this video encoder operates to process a video signal 110 to generate a processed video signal 112. In particular, video signal 110 includes a stereoscopic video signal that includes right and left views.

In an embodiment of the present invention, the processed video signal 112 can be an encoded stereoscopic video signal having a base layer that includes a 2D compatible base layer and an enhancement layer generated by processing in accordance with the current MVC extension of MPEG-4 AVC. In addition, processed video signal 112 includes a reference processing unit (RPU) layer in accordance with the Dolby Laboratories Inc. contribution ISO/IEC JTC1/SC29/WG11, MPEG2010/M17926 entitled, "A Frame Compatible System for 3D Delivery", the contents of which are incorporated herein by reference thereto. As discussed in this contribution, stereoscopic video signals can a video signal where right view and left view video data multiplexed as either side by side (SBS) or over and under (OU) format.

The video encoder 102 includes a processing module that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In accordance with the present invention, the processing module of video encoder 102 can include base layer encoder 120 and enhancement layer encoder 122 for generating the base layer and an enhancement layer in accordance with the current MVC extension of MPEG-4 AVC. In addition, the processing module of video encoder 102 includes an RPU encoder 124 for generating the RPU layer in accordance with ISO/IEC JTC1/SC29/WG11, MPEG2010/M17926. In contrast to ISO/IEC JTC1/SC29/WG11, MPEG2010/M17926, RPU layer encoder 124 includes a separable 2D filter 125 that will be discussed in greater detail in conjunction with FIGS. 6-7.

Figure 5:
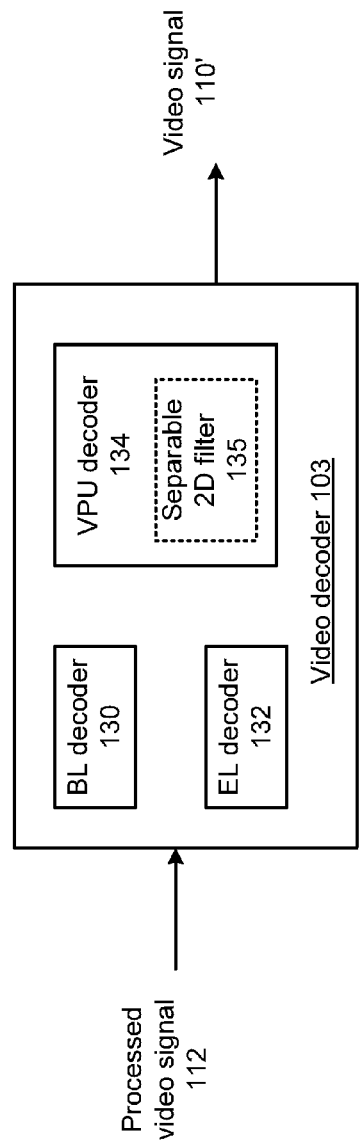
FIG. 5 presents a block diagram representation of a video decoder 103 in accordance with an embodiment of the present invention.

FIG. 5 presents a block diagram representation of a video decoder 103 in accordance with an embodiment of the present invention. In particular, this video encoder operates to decode processed video signal 112 to generate a video signal 110'. In particular, video signal 110' can includes a stereoscopic video signal similar to video signal 110 or a standard 2D video signal derived from one or another of the two views of video signal 110 based on the application, the capabilities of the display device, etc.

The video decoder 103 includes a processing module that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In accordance with the present invention, the processing module of video decoder 103 can include base layer decoder 130 and enhancement layer decoder 132 for decoding the base layer and an enhancement layer in accordance with the current MVC extension of MPEG-4 AVC. In addition, the processing module of video decoder 103 includes an RPU decoder 134 for decoding the RPU layer in accordance with ISO/IEC JTC1/SC29/WG11, MPEG2010/M17926. In contrast to ISO/IEC JTC1/SC29/WG11, MPEG2010/M17926, RPU layer decoder 134 includes a separable 2D filter 135 that will be discussed in greater detail in conjunction with FIGS. 6-7.

Figure 6:
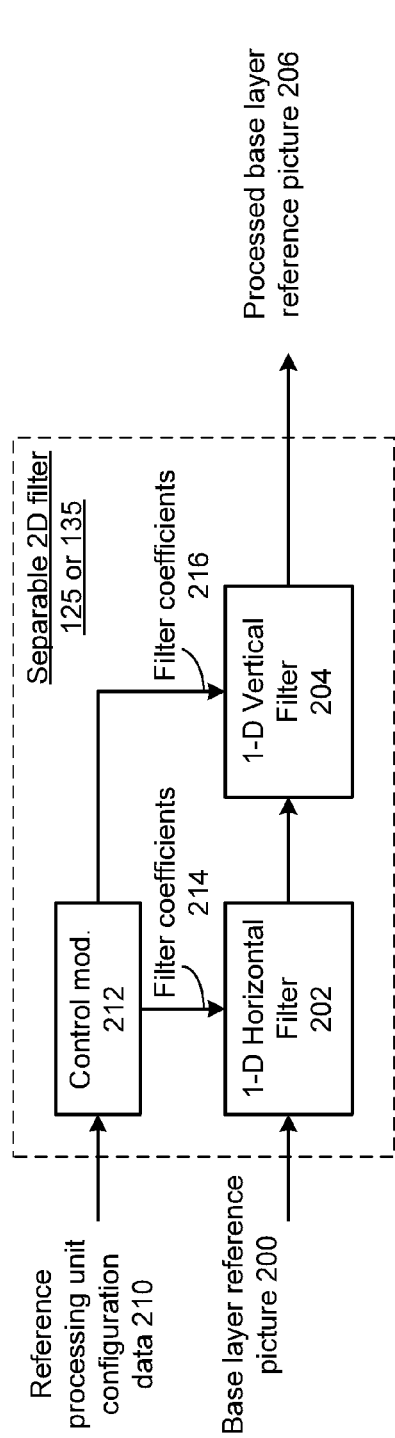
FIG. 6 presents a block diagram representation of a 2D filter 125 or 135 in accordance with an embodiment of the present invention.

FIG. 6 presents a block diagram representation of a 2D filter 125 or 135 in accordance with an embodiment of the present invention. The RPU processing described in conjunction with ISO/IEC JTC1/SC29/WG11, MPEG2010/M17926, includes several non-separable two dimensional filters for processing a reference picture. These non-separable filters operate by filtering 2D blocks of pixels based on a matrix of filter coefficients. In contrast, to a non-separable 2D filter, 2D filter 125 or 135 operates based on two one-dimensional coefficient vectors to filter sections of columns (vertically) and sections of rows (horizontally). By separating the filtering into horizontal and vertical components, the 2D filter 125 or 135 can be implemented more efficiently, allow faster computation, etc.

The separable two-dimensional filter 125 or 135 generates a processed base layer reference picture 206 from a base layer reference picture 200. In particular, a one-dimensional horizontal filter 202 horizontally filters the base layer reference picture 200 to generate a first filtered base layer reference picture. A one-dimensional vertical filter 204, separate from the one-dimensional horizontal filter 202, vertically filters the first filtered base layer reference picture to generate the pre-processed base layer reference picture 206.

In an embodiment of the present invention, the one-dimensional horizontal filter 202 is a multi-tap digital filter that filters the base layer reference picture 200 in accordance with a plurality of filter coefficients 214. Further, the one-dimensional vertical filter 204 is also a multi-tap digital filter that filters the first filtered base layer reference picture in accordance with a plurality of filter coefficients 216. The filter coefficients 214 and 216 are chosen in order to approximate the 2D non-separable filtering performed in conjunction with ISO/IEC JTC1/SC29/WG11, MPEG2010/M17926.

Further, ISO/IEC JTC1/SC29/WG11, MPEG2010/M17926 describes the implementation of different 2D non-separable filters based on the rpu_type (0, 1) and rpu_format (SBS, OU). Control module 212 responds to reference processing unit configuration data 210 that indicates the rpu_type (0, 1) and rpu_format (SBS, OU) to generate the filter coefficients 214 and 216 based on the particular rpu_type and rpu_format. Control module 212 can include a look up table, state machine or other hardware, software or firmware to load the one dimensional horizontal filter 202 with the appropriate filter coefficients 214 and the one dimensional vertical filter 204 with the appropriate filter coefficients 216, based on whether the rpu_format is SBS or OU and further based on whether the rpu_type is either 1 or 0.

Figure 7:
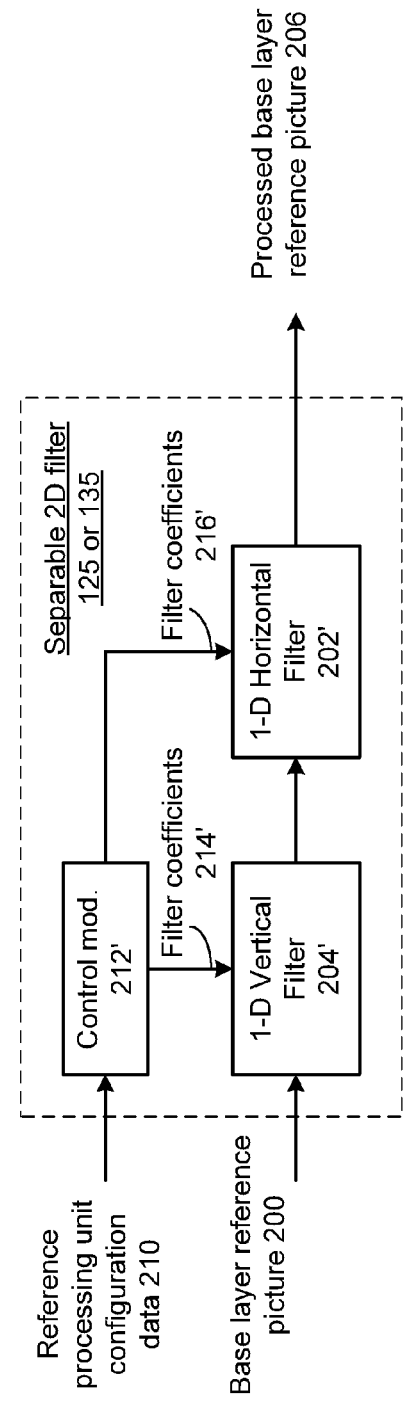
FIG. 7 presents a block diagram representation of a 2D filter 125 or 135 in accordance with another embodiment of the present invention.

FIG. 7 presents a block diagram representation of a 2D filter 125 or 135 in accordance with another embodiment of the present invention. In this embodiment, one-dimensional vertical filter 204' vertically filters the base layer reference picture 200 to generate a first filtered base layer reference picture. A one-dimensional horizontal filter 202', separate from the one-dimensional vertical filter 204', horizontally filters the first filtered base layer reference picture to generate the pre-processed base layer reference picture 206.

In an embodiment of the present invention, the one-dimensional vertical filter 204' is a multi-tap digital filter that filters the base layer reference picture 200 in accordance with a plurality of filter coefficients 214'. Further, the one-dimensional horizontal filter 204' is also a multi-tap digital filter that filters the first filtered base layer reference picture in accordance with a plurality of filter coefficients 216'. The filter coefficients 214' and 216' are chosen in order to approximate the 2D non-separable filtering performed in conjunction with ISO/IEC JTC1/SC29/WG11, MPEG2010/M17926.

Control module 212' responds to reference processing unit configuration data 210 that indicates rpu_type and rpu_format, to generate the filter coefficients 214' and 216' based on the particular rpu_type and rpu_format. Control module 212' can include a look up table, state machine or other hardware, software or firmware to load the one dimensional horizontal filter 202' with the appropriate filter coefficients 216' and the one dimensional vertical filter 204' with the appropriate filter coefficients 214', based on whether the rpu_format is SBS or OU and further based on whether the rpu_type is either 1 or 0.

Figure 8:
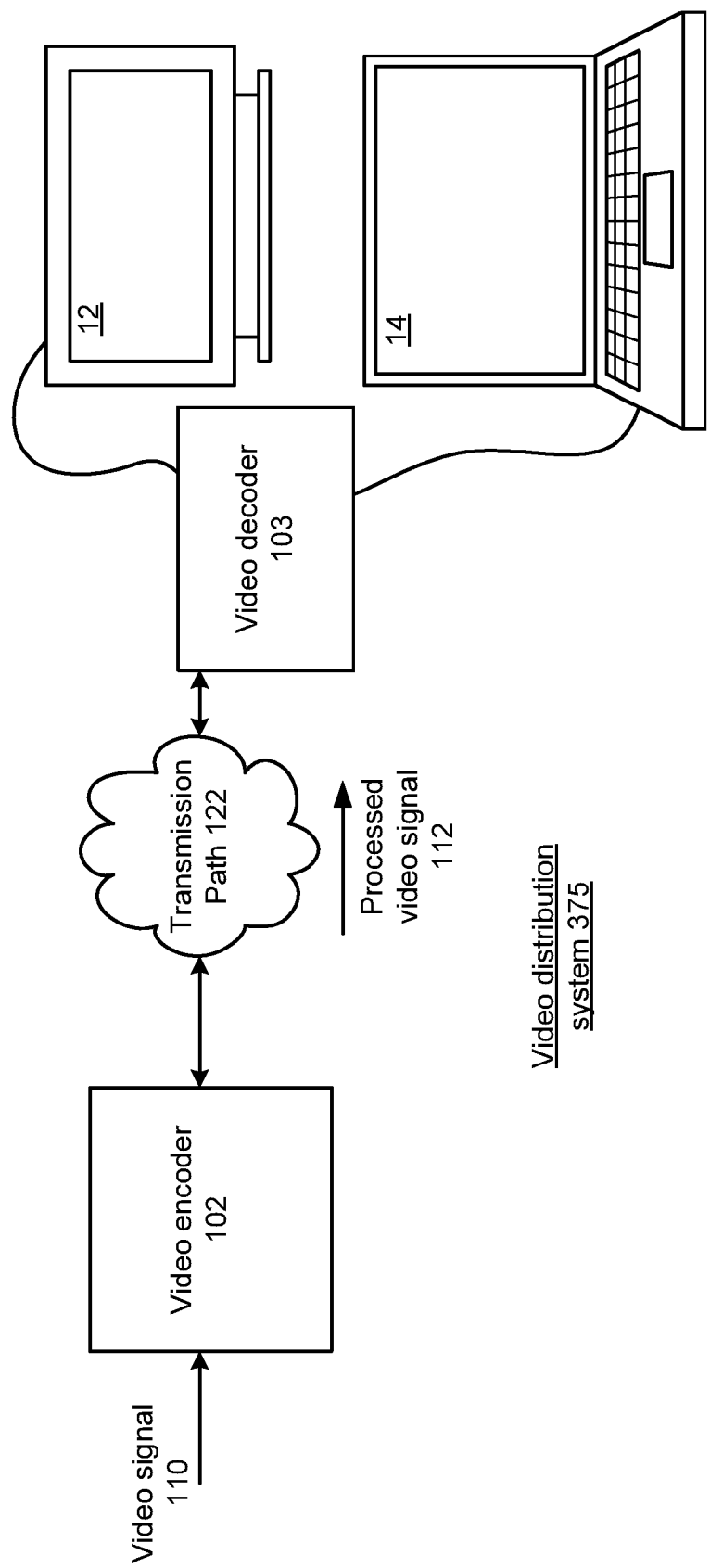
FIG. 8 presents a block diagram representation of a video distribution system 375 in accordance with an embodiment of the present invention.

FIG. 8 presents a block diagram representation of a video distribution system 375 in accordance with an embodiment of the present invention. In particular, processed video signal 112 is transmitted from a video encoder 102 via a transmission path 122 to a video decoder 103. The video display devices, such as television 12, computer 14, each may be either stereoscopic devices or non-stereoscopic devices. The video decoder 103 operates to decode the processed video signal 112 for display on a display devices 12 or 14 or other display device. In an embodiment of the present invention, video decoder 103 can be implemented in a set-top box, digital video recorder, router or home gateway. In the alternative, decoder 103 can optionally be incorporated directly in the display device 12 or 14.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 9:
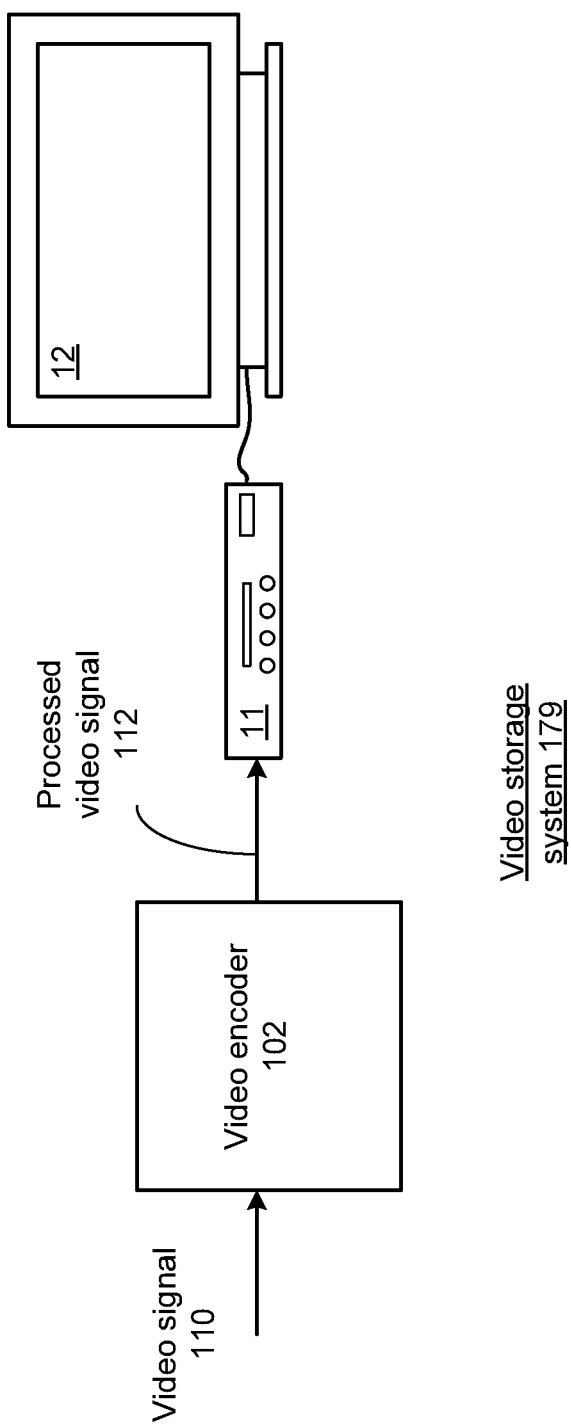
FIG. 9 presents a block diagram representation of a video storage system 179 in accordance with an embodiment of the present invention.

FIG. 9 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112. In this configuration, device 11 can include video decoder 103 that operates to decode the processed video signal 112 when retrieved from storage to generate a video signal 110' in a format that is suitable for display by video display device 12 or 14 While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

FIG. 10 presents a block diagram representation of a method in accordance with an embodiment of the present invention. In particular, a method is presented for use in conjunction with one or more functions and features described in conjunction with FIGS. 1-9. In step 400, a base layer reference picture is horizontally filtered to generate a first filtered base layer reference picture. In step 402, the first filtered base layer reference picture is vertically filtered, separate from the horizontal filtering, to generate a pre-processed base layer reference picture.

FIG. 11 presents a block diagram representation of a method in accordance with an embodiment of the present invention. In particular, a method is presented for use in conjunction with one or more functions and features described in conjunction with FIGS. 1-9. In step 410, side-by-side picture values of the plurality of first filter coefficients and the plurality of second filter coefficients are selected based on reference processing unit configuration data that indicates a side-by-side picture type.

FIG. 12 presents a block diagram representation of a method in accordance with an embodiment of the present invention. In particular, a method is presented for use in conjunction with one or more functions and features described in conjunction with FIGS. 1-9. In step 420, over-under picture values of the plurality of first filter coefficients and the plurality of second filter coefficients are selected based on reference processing unit configuration data that indicates a over-under picture type.

FIG. 13 presents a block diagram representation of a method in accordance with an embodiment of the present invention. In particular, a method is presented for use in conjunction with one or more functions and features described in conjunction with FIGS. 1-9. In step 430, a base layer reference picture is vertically filtered to generate a first filtered base layer reference picture. In step 432, the first filtered base layer reference picture is horizontally filtered, separate from the vertical filtering, to generate a pre-processed base layer reference picture.

In an embodiment of the present invention, the horizontal filtering is in accordance with a plurality of first filter coefficients and the vertical filtering is in accordance with a plurality of second filter coefficients.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a separable two-dimensional filter for use in the production of a RPU layer used in stereoscopic encoding and decoding. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A two-dimensional filter for use in processing a three-dimensional television signal in accordance with a basic layer, a reference processing unit layer and an enhancement layer, wherein the two-dimensional filter generates a processed base layer reference picture from a base layer reference picture, the two-dimensional filter comprising:
    a one-dimensional horizontal filter that horizontally filters the base layer reference picture in accordance with a first multi-tap filter function having a plurality of first filter coefficients to generate a first filtered base layer reference picture;
    a one-dimensional vertical filter, coupled to, but separable from, the one-dimensional horizontal filter, that vertically filters the first filtered base layer reference picture in accordance with a second multi-tap filter function having a plurality of second filter coefficients to generate a pre-processed base layer reference picture; and
    a control module, coupled to the one-dimensional horizontal filter and the one-dimensional vertical filter, that responds to reference processing unit configuration data that indicates one of a plurality of picture types to select values of the plurality of first filter coefficients and values of the plurality of second filter coefficients based on the one of a plurality of picture types.

2. The two-dimensional filter of claim 1 wherein the one-dimensional horizontal filter is a multi-tap digital filter that filters the base layer reference picture in accordance with the plurality of first filter coefficients.

3. The two-dimensional filter of claim 2 wherein the one-dimensional vertical filter is a multi-tap digital filter that filters the first filtered base layer reference picture in accordance with the plurality of second filter coefficients.

4. The two-dimensional filter of claim 3, when the reference processing unit configuration data indicates a side-by-side picture type, the control module selects side-by-side picture values of the plurality of first filter coefficients and the plurality of second filter coefficients.

5. The two-dimensional filter of claim 3, when the reference processing unit configuration data indicates an over-under picture type, the control module selects over-under picture values of the plurality of first filter coefficients and the plurality of second filter coefficients.

6. A two-dimensional filter for use in processing a three-dimensional television signal in accordance with a basic layer, a reference processing unit layer and an enhancement layer, wherein the two-dimensional filter generates a processed base layer reference picture from a base layer reference picture, the two-dimensional filter comprising:
    a one-dimensional vertical filter that vertically filters the base layer reference picture in accordance with a first multi-tap filter function having a plurality of first filter coefficients to generate a first filtered base layer reference picture; and
    a one-dimensional horizontal filter, coupled to, but separable from, the one-dimensional vertical filter, that horizontally filters the first filtered base layer reference picture in accordance with a second multi-tap filter function having a plurality of second filter coefficients to generate a pre-processed base layer reference picture; and
    a control module, coupled to the one-dimensional horizontal filter and the one-dimensional vertical filter, that responds to reference processing unit configuration data that indicates one of a plurality of picture types to select values of the plurality of first filter coefficients and values of the plurality of second filter coefficients.

7. The two-dimensional filter of claim 6 wherein the one-dimensional vertical filter is a multi-tap digital filter that filters the base layer reference picture in accordance with the plurality of first filter coefficients.

8. The two-dimensional filter of claim 7 wherein the one-dimensional horizontal filter is a multi-tap digital filter that filters the first filtered base layer reference picture in accordance with the plurality of second filter coefficients.

9. The two-dimensional filter of claim 8, when the reference processing unit configuration data indicates a side-by-side picture type, the control module selects side-by-side picture values of the plurality of first filter coefficients and the plurality of second filter coefficients.

10. The two-dimensional filter of claim 8, when the reference processing unit configuration data indicates an over-under picture type, the control module selects over-under picture values of the plurality of first filter coefficients and the plurality of second filter coefficients.

11. A method for use in processing a three-dimensional television signal in accordance with a basic layer, a reference processing unit layer and an enhancement layer, wherein a two-dimensional filter generates a processed base layer reference picture from a base layer reference picture, the method comprising:
    horizontal filtering the base layer reference picture in accordance with a first multi-tap filter function having a plurality of first filter coefficients to generate a first filtered base layer reference picture;
    vertical filtering, separate from the horizontal filtering, the first filtered base layer reference picture in accordance with a second multi-tap filter function having a plurality of second filter coefficients to generate a pre-processed base layer reference picture; and
    selecting values of the plurality of first filter coefficients and values of the plurality of second filter coefficients based on one of a plurality of picture types in response to reference processing unit configuration data that indicates the one of the plurality of picture types.

12. The method of claim 11 wherein the horizontal filtering is in accordance with the plurality of first filter coefficients.

13. The method of claim 12 wherein the vertical filtering is in accordance with the plurality of second filter coefficients.

14. The method of claim 13 further comprising:
    selecting side-by-side picture values of the plurality of first filter coefficients and the plurality of second filter coefficients when the reference processing unit configuration data indicates a side-by-side picture type.

15. The method of claim 13 further comprising:
    selecting over-under picture values of the plurality of first filter coefficients and the plurality of second filter coefficients when the reference processing unit configuration data indicates a over-under picture type.

16. A method for use in processing a three-dimensional television signal in accordance with a basic layer, a reference processing unit layer and an enhancement layer, wherein a two-dimensional filter generates a processed base layer reference picture from a base layer reference picture, the two-dimensional filter comprising:
- vertical filtering the base layer reference picture in accordance with a first multi-tap filter function having plurality of first filter coefficients to generate a first filtered base layer reference picture;
- horizontal filtering, separate from the vertical filtering, the first filtered base layer reference picture in accordance with a second multi-tap filter function having a plurality of second filter coefficients to generate a pre-processed base layer reference picture; and
- selecting values of the plurality of first filter coefficients and values of the plurality of second filter coefficients in response to reference processing unit configuration data that indicates one of a plurality of picture types.

17. The method of claim 16 wherein the horizontal filtering is in accordance with the plurality of first filter coefficients.

18. The method of claim 17 wherein the vertical filtering is in accordance with the plurality of second filter coefficients.

19. The method of claim 18 further comprising:
- selecting side-by-side picture values of the plurality of first filter coefficients and the plurality of second filter coefficients when the reference processing unit configuration data indicates a side-by-side picture type.

20. The method of claim 18 further comprising:
- selecting over-under picture values of the plurality of first filter coefficients and the plurality of second filter coefficients when the reference processing unit configuration data indicates a over-under picture type.

* * * * *